[12] United States Patent  (10) Patent No.: US 7,469,292 B2
Landsman et al.  (45) Date of Patent: Dec. 23, 2008

(54) MANAGING ELECTRONIC MESSAGES USING CONTACT INFORMATION

(75) Inventors: Richard A. Landsman, Scotts Valley, CA (US); Timothy Thomas Sullivan, Portola Valley, CA (US); Jay Dare Logue, San Jose, CA (US)

(73) Assignee: AOL LLC, Dulles, VA (US)

( * ) Notice: Subject to any disclaimer, the term of this patent is extended or adjusted under 35 U.S.C. 154(b) by 798 days.

(21) Appl. No.: 11/015,066

(22) Filed: Dec. 17, 2004

(65) Prior Publication Data

US 2005/0198171 A1  Sep. 8, 2005

Related U.S. Application Data

(60) Provisional application No. 60/543,806, filed on Feb. 11, 2004.

(51) Int. Cl.
*G06F 15/173* (2006.01)
*G06F 15/16* (2006.01)

(52) U.S. Cl. .................. 709/225; 709/207; 709/229

(58) Field of Classification Search ............... 709/206, 709/207, 224, 225, 245
See application file for complete search history.

(56) References Cited

U.S. PATENT DOCUMENTS

| | | | |
|---|---|---|---|
| 4,977,520 A | 12/1990 | McGaughey, III et al. |
| 5,040,141 A | 8/1991 | Yazima et al. |
| 5,093,918 A | 3/1992 | Heyen et al. |
| 5,159,673 A | 10/1992 | Sackmann et al. |
| 5,204,961 A | 4/1993 | Barlow |
| 5,245,532 A | 9/1993 | Mourier |
| 5,283,856 A | 2/1994 | Gross et al. |
| 5,319,776 A | 6/1994 | Hile et al. |
| 5,333,266 A | 7/1994 | Boaz et al. |
| 5,377,354 A | 12/1994 | Scannell et al. |
| 5,423,042 A | 6/1995 | Jalili et al. |
| 5,448,734 A | 9/1995 | Hrabik et al. |
| 5,471,519 A | 11/1995 | Howe et al. |
| 5,473,671 A | 12/1995 | Partridge, III |
| 5,539,828 A | 7/1996 | Davis |
| 5,548,789 A | 8/1996 | Nakanura |

(Continued)

FOREIGN PATENT DOCUMENTS

DE  19708856  9/1998

(Continued)

OTHER PUBLICATIONS

NAGS Spam Filter [online], Oct. 30, 1997. Retrieved from the Internet http://www.nags.org/spamfilter.html, pp. 1-11.

(Continued)

*Primary Examiner*—Paul H Kang
(74) *Attorney, Agent, or Firm*—Workman Nydegger

(57) ABSTRACT

A system may include an electronic messaging management application that may access contact information. The contact information may include information maintained by one or more system users. The electronic messaging management application may determine how to process an incoming electronic message using at least a portion of the contact information. The electronic messaging management application may determine whether to send a challenge-response message to a sender of an electronic message using at least a portion of the contact information.

18 Claims, 8 Drawing Sheets

U.S. PATENT DOCUMENTS

| | | |
|---|---|---|
| 5,600,799 A | 2/1997 | Young et al. |
| 5,604,803 A | 2/1997 | Aziz |
| 5,608,786 A | 3/1997 | Gordon |
| 5,619,648 A | 4/1997 | Canale et al. |
| 5,627,764 A | 5/1997 | Schutzman et al. |
| 5,630,123 A | 5/1997 | Hogge |
| 5,632,018 A | 5/1997 | Otorii |
| 5,655,079 A | 8/1997 | Hirasawa et al. |
| 5,721,779 A | 2/1998 | Funk |
| 5,734,903 A | 3/1998 | Saulpaugh et al. |
| 5,742,668 A | 4/1998 | Pepe et al. |
| 5,742,769 A | 4/1998 | Lee et al. |
| 5,781,857 A | 7/1998 | Hwang et al. |
| 5,796,840 A | 8/1998 | Davis |
| 5,826,022 A | 10/1998 | Nielsen |
| 5,832,227 A | 11/1998 | Anderson et al. |
| 5,835,722 A | 11/1998 | Bradshaw et al. |
| 5,859,967 A | 1/1999 | Kaufeld et al. |
| 5,884,033 A | 3/1999 | Duvall et al. |
| 5,893,911 A | 4/1999 | Piskiel et al. |
| 5,909,589 A | 6/1999 | Parker et al. |
| 5,917,489 A | 6/1999 | Thurlow et al. |
| 5,930,479 A | 7/1999 | Hall |
| 5,937,162 A | 8/1999 | Funk et al. |
| 5,999,600 A | 12/1999 | Shin |
| 5,999,932 A | 12/1999 | Paul |
| 5,999,967 A | 12/1999 | Sundsted |
| 6,014,634 A | 1/2000 | Scroggie et al. |
| 6,023,723 A | 2/2000 | McCormick et al. |
| 6,052,709 A | 4/2000 | Paul |
| 6,055,510 A | 4/2000 | Henrick et al. |
| 6,057,841 A | 5/2000 | Thurlow et al. |
| 6,092,101 A | 7/2000 | Birrell et al. |
| 6,112,227 A | 8/2000 | Heiner |
| 6,154,765 A | 11/2000 | Hart |
| 6,173,322 B1 | 1/2001 | Hu |
| 6,182,118 B1 | 1/2001 | Finney et al. |
| 6,189,026 B1 | 2/2001 | Birrell et al. |
| 6,195,698 B1 | 2/2001 | Lillibridge et al. |
| 6,199,102 B1 | 3/2001 | Cobb |
| 6,199,106 B1 | 3/2001 | Shaw et al. |
| 6,205,432 B1 | 3/2001 | Gabbard et al. |
| 6,226,372 B1 | 5/2001 | Beebe et al. |
| 6,230,188 B1 | 5/2001 | Marcus |
| 6,237,027 B1 | 5/2001 | Namekawa |
| 6,249,807 B1 | 6/2001 | Shaw et al. |
| 6,266,692 B1 | 7/2001 | Greenstein |
| 6,282,565 B1 | 8/2001 | Shaw et al. |
| 6,349,328 B1 | 2/2002 | Haneda et al. |
| 6,356,935 B1 | 3/2002 | Gibbs |
| 6,366,950 B1 | 4/2002 | Scheussler et al. |
| 6,373,950 B1 | 4/2002 | Rowney |
| 6,393,465 B2 | 5/2002 | Leeds |
| 6,421,709 B1 | 7/2002 | McCormick et al. |
| 6,457,044 B1 | 9/2002 | IwaZaki |
| 6,460,074 B1 | 10/2002 | Fishkin |
| 6,546,416 B1 | 4/2003 | Kirsch |
| 6,587,550 B2 | 7/2003 | Council et al. |
| 6,625,257 B1 | 9/2003 | Asaoka et al. |
| 6,640,301 B1 | 10/2003 | Ng |
| 6,671,718 B1 | 12/2003 | Meister et al. |
| 6,678,704 B1 | 1/2004 | Bridge, Jr. et al. |
| 6,691,156 B1 | 2/2004 | Drummond et al. |
| 6,708,205 B2 | 3/2004 | Sheldon et al. |
| 6,748,422 B2 | 6/2004 | Morin et al. |
| 6,868,498 B1 | 3/2005 | Katsikas |
| 7,043,753 B2 | 5/2006 | Roddy et al. |
| 7,065,341 B2 | 6/2006 | Kamiyama et al. |
| 7,076,533 B1 | 7/2006 | Knox et al. |
| 7,085,925 B2 | 8/2006 | Hanna et al. |
| 7,120,927 B1 | 10/2006 | Beyda et al. |
| 7,136,897 B1 | 11/2006 | Raghunandan |
| 7,185,194 B2 | 2/2007 | Morikawa et al. |
| 7,188,358 B1 | 3/2007 | Hisada et al. |
| 2002/0042815 A1 | 4/2002 | Salzfass et al. |
| 2002/0046099 A1 | 4/2002 | Frengut et al. |
| 2002/0046250 A1 | 4/2002 | Nassiri |
| 2002/0099781 A1 | 7/2002 | Scheussler et al. |
| 2002/0107856 A1 | 8/2002 | Scheussler et al. |
| 2002/0116641 A1 | 8/2002 | Mastrianni |
| 2002/0147726 A1 | 10/2002 | Yehia et al. |
| 2002/0194308 A1 | 12/2002 | Hall |
| 2002/0199095 A1 | 12/2002 | Bandini et al. |
| 2003/0009698 A1 | 1/2003 | Lindeman et al. |
| 2003/0023736 A1 | 1/2003 | Abkemeier |
| 2003/0037250 A1 | 2/2003 | Walker et al. |
| 2003/0065926 A1 | 4/2003 | Schultz et al. |
| 2003/0086543 A1 | 5/2003 | Raymond |
| 2003/0097597 A1 | 5/2003 | Lewis |
| 2003/0110400 A1 | 6/2003 | Cartmell et al. |
| 2003/0163691 A1 | 8/2003 | Johnson |
| 2003/0167311 A1 | 9/2003 | Kirsch |
| 2003/0167402 A1 | 9/2003 | Stolfo et al. |
| 2003/0191969 A1 | 10/2003 | Katsikas |
| 2003/0196116 A1 | 10/2003 | Troutman |
| 2003/0200267 A1 | 10/2003 | Garrigues |
| 2003/0233418 A1 | 12/2003 | Goldman |
| 2003/0236847 A1 | 12/2003 | Benowitz et al. |
| 2004/0015554 A1 | 1/2004 | Wilson |
| 2004/0054887 A1 | 3/2004 | Paulsen, Jr. et al. |
| 2004/0087300 A1 | 5/2004 | Lewis |
| 2004/0111480 A1 | 6/2004 | Yue |
| 2004/0148358 A1 | 7/2004 | Singh et al. |
| 2004/0167941 A1 | 8/2004 | Prahlad et al. |
| 2004/0181581 A1 | 9/2004 | Kosco |
| 2004/0199595 A1 | 10/2004 | Banister et al. |
| 2005/0076221 A1 | 4/2005 | Olkin et al. |
| 2005/0076222 A1 | 4/2005 | Olkin et al. |
| 2005/0081059 A1 | 4/2005 | Bandini et al. |
| 2006/0059238 A1 | 3/2006 | Slater et al. |
| 2006/0112165 A9 | 5/2006 | Tomkow et al. |

FOREIGN PATENT DOCUMENTS

| | | |
|---|---|---|
| EP | 0463252 | 1/1992 |
| EP | 0651533 | 5/1995 |
| EP | 0686327 | 12/1995 |
| EP | 0721268 | 7/1996 |
| EP | 0725523 | 8/1996 |
| EP | 0760565 | 7/1998 |
| EP | 0883271 | 12/1998 |
| WO | 94/06236 | 3/1994 |
| WO | 96/09714 | 3/1996 |
| WO | 96/24213 | 8/1996 |
| WO | 97/14234 | 4/1997 |
| WO | 97/20423 | 6/1997 |
| WO | 97/23082 | 6/1997 |
| WO | 97/24825 | 7/1997 |
| WO | 97/26709 | 7/1997 |
| WO | 98/37675 | 8/1998 |
| WO | 99/10817 | 3/1999 |
| WO | 01/16695 | 3/2001 |
| WO | 02/077768 | 10/2002 |
| WO | 03/044617 | 5/2003 |

OTHER PUBLICATIONS

Unsolicited Bulk Email: Mechanisms for Control, by Paul Hoffman and Dave Crocker, Internet Mail Consortium Report UBE-SOL, IMCR-008, revised May 4, 1998, pp. 1-16.

Unsolicited Bulk Email: Mechanisms for Control, by Paul Hoffman and Dave Crocker, Internet Mail Consortium Report UBE-SOL, IMCR-005, Oct. 13, 1997, pp. 1-31.

Controlling E-Mail Spam [online] [retrieved on Mar. 28, 2003]. Retrieved from the Internet http://spam.abuse.net/adminhelp/mail.shtml, pp. 1-5.

The Penny Black Project [online] ]retrieved on May 8, 2006]. Retrieved from the Internet http://research.microsoft.com/research/sv/PennyBlack/, pp. 1-2.

Foiling Spam with an Email Password System [online] retrieved on Jun. 28, 2004]. Retrieved from the Internet http://www.uwasa.fi/~ts/info/spamfoil.html, pp. 1-10.

Aguilar, Rose, AOL fights to ban junk, CNETNews.com, Sep. 6, 1996, 3 pages, http://www.news.com/News/Item/0.43106,00.html.

Andrew Leonard, SpamBomers, Sep. 1997, 7 pages, Salon Magazine + about 21st + newsletter.

Bob Tiptrie, A Way to Stop Spam Messages, online, retrieved Apr. 25, 2003, 4 pages, retrieved from the internet http://groups.google.com/groups.

Cementing Online Partnerships and Improving User Experience, RSA Security, retrived online May 17, 2006, 7 pages, www.rsasecurity.com.

Chinese Abstract for CN 1117680, published Feb. 28, 1996.

CNET News.com staff, ISP: Internet Spam Provider, Feb. 18, 1997, 2 pages, CNET News.com.

Cole-Gomolski, Barb, Adoption of S/MIME still lagging, May 11, 1998, 4 pages, http://www.computerworld.com/home/features.nsf/ . . . .

Cynthia Dwork et al., Pricing via Processing or Combatting Junk Mail, Jul. 2002, 12 pages, Technical Report CS95-20, Mathematics & Computer Science, Weizmann Institute of Science.

Cynthia Dwork, Fighting Spam May be Easier Than You Think, 1992, 30 pages, presentation given in Crypto.

Cynthia Dwork, Fighting Spam: The Science, 2004, pp. 3-4, M. Farach-Colton (Ed.): Latin 2004, LNCS 2976, Springer-Verlag Berlin.

D.J. Berstein, Variable Envelope Return Paths, Feb. 1, 1997, 2 pages, http://cr.yp.to/proto/verp.txt.

David A. Wheeler, Countering Spam with Ham-Authenticated Email and the Guarded Email Protocol, Draft: First version Dec. 8, 2002; Released Apr. 2, 2003, 28 pages, dwheeler@dwheeler.com.

David F. Skoll, How to make SURE a human is sending you mail (was Re: Random e-mails), Nov. 15, 2006, 2 pages, news.admin.net-abuse.usenet, http://groups.google.com/group/news.admin.net-abuse.usenet/msg/e601783e8f40c54?d . . . .

Dealing with Unsolicited Commercial Email (UCE, "email spam"), 2005 Public Access Networks Corporation, online, retrieved on Jun. 6, 2006, 3 pages, retrieved from the Internet http://www.panix.com/uce.html, Copyright 2003.

Douglas G. Henke, All Hail Emperor Lewis?, online, Feb. 20, 1997, 2 pages, retrived Apr. 25, 2003, retrived from the internet http://groups.google.com/groups.

Ed Foster, The Gripe Line Threatening legal action may be the quickeest way off a junk e-mailer's list, Info World Info Quote, Sep. 9, 1996, 2 pages, vol. 18, Issue 37, http://www.infoworld.com/egi-bin/siplayArchives.pl? . . . .

J. Klensin et al., IMAP/POP Authorize Extension for Simple Challenge/Response, Sep. 1997, 5 pages.

Jameson, Bob, Filter for mail not addressed to you, Jesse Berst's Anchor Desk, Sep. 6, 1996, 3 pages, http://www.news.com/News/Item/0.43106,00.html.

Janet Kornblum, Programmer Writes Spam Bomb, Aug. 6, 1997, 2 pages, CNET News.com.

Julian Byrne, My Spamblock; Was: Thwarting UCE Address Culling Programs, online, Jan. 19, 1997, 2 pages, retrieved Apr. 28, 2003, retrieved from the internet http://google.com/groups.

Julian Byrne, New Improved EZSPAM! Was: My Spamblock . . . , online, Jan. 28, 1997, 4 pages, retrieved Apr. 25, 2003, retrived from the internet, http://groups.google.com/groups.

MailCircuit's Email HandShake Verification and Spam Filter Process, online, copyright 1996-2003, 2 pages, MailCircuit.com, retrieved from the Internet http://www.mailcircuit.com/filter.htm.

Michael's Stop Junk E-Mail, Stop Junk E-Mail, Nov. 17, 1996, 2 pages, http:/www.crl.com/-michaelp/stopjunkmail.html.

Mihir Bellare et al., Does Parallel Repition Lower the Error in Computationally Sound Protocols?, 1997, 24 pages, Proceedings of the 38th Symposium on Foundations of Computer Science, IEEE.

MIT LCS, Applied Security Reading Group, by Email Sit and Kevin Fu, 2 pages, updated May 5, 2003 on the Internet http://www.pdocs.lcs.mit.edu/asrg/.

Noni Naor, Verification of a Human in the Loop or Identification via the Turing Test, Sep. 1996, Cited in All On-Line Papers.

P. Resnick, RFC28822, Apr. 2001, 51 pages, Qualcom Incorporated, http:rfc.net/rfc2822.html.

Public Access Networks Corporation, Responding to Unsolicited Commercial Email (UCE, "email spam"), Feb. 25, 1997, 5 pages, http:www.panix.com/uce.html.

Ronald F. Guilmette, To Mung or Not to Mung, online, Jul. 24, 1997, 2 pages, retrieved Apr. 25, 2003, retrieved from the internet http://groups.google.com/groups.

Showing Full Headers of a Message, Nov. 6, 1998, 3 pages, http:/www.panix.com/headers.html.

Tim Richardson, Simple Notes on Internet Security and Email, Jun. 28, 1999, 2 pages, http:/www.timrichardson.net/security.html.

MANAGING ELECTRONIC MESSAGES USING CONTACT INFORMATION

CROSS-REFERENCE TO RELATED APPLICATIONS

This application claims priority to and the benefit of U.S. Provisional Patent Application Ser. No. 60/543,806, filed Feb. 11, 2004 and entitled USING A COLLECTION OF CONTACT INFORMATION TO ASSIST IN CHALLENGE RESPONSE DECISIONS, which is hereby incorporated by reference herein in its entirety.

BACKGROUND OF THE INVENTION

1. The Field of the Invention

The present invention relates generally to electronic messaging. More specifically, the present invention relates to systems and methods for managing the delivery of electronic messages.

2. Related Technology

Many people and businesses have found electronic messaging, such as emailing and instant messaging, a convenient method of communication because sending and receiving electronic messages can be easy.

Unfortunately, the ease with which electronic messages may be generated and sent has led to the development of unsolicited bulk electronic messages, better known as "spam." Unsolicited electronic messages come from a large spectrum of different sources and often include commercial advertisements, political messaging, and other undesirable content including pornographic solicitations.

To many users, it seems that the number of unsolicited messages that they receive increases daily. Receiving unsolicited electronic messages is frustrating for many users because they must sort through each electronic message they receive. If they do not sort through their messages regularly, the number of unsolicited electronic messages may soon outnumber the desired electronic messages and make it difficult for a user to find certain electronic messages. Users are understandably frustrated that they must waste time sorting through unsolicited electronic messages that they receive daily. Even if simply deleting the unsolicited electronic messages, users can waste significant amounts of time.

Once started, this flood of unsolicited electronic messages is difficult to stop. Senders of bulk unsolicited electronic messages are difficult to track down because they typically fabricate a sender's electronic address or refrain from including a sender's electronic address altogether. Also, because a bulk address list (depending on how large it is) can be a valuable commodity for use or for sale, holders of bulk address lists typically refuse to remove any address from a list, which would reduce the value of the list. Accordingly, persons that receive bulk unsolicited electronic messages are often unable to successfully request that their address be removed from a bulk address list.

With good reason, users have become wary of giving out their electronic addresses for fear that their electronic addresses will wind up in the hands of those who send unsolicited electronic messages.

For these reasons, users need a way to successfully prevent unwanted or unsolicited electronic messages from being delivered. Some attempts have been made to allow users to filter out unwanted and/or unsolicited electronic messages.

One method allows a recipient to block a sender's e-mail address by adding the sender's e-mail address to the recipient's list of unauthorized senders. However, this method falls short because the sender simply may fabricate a different e-mail address to circumvent the block. Further, before any email from the sender is blocked, the recipient must view an e-mail from the sender, determine that it is unsolicited, and manually add the sender's e-mail address to the recipient's list of unauthorized senders.

Another method filters e-mail that includes certain words or phrases. For example, a recipient that frequently receives unsolicited offers for mortgage loans may add the phrase "mortgage rate" into a filtering component of the recipient's e-mail program. Subsequent e-mail that contains the phrase "mortgage rate" is filtered into a delete or trash folder.

However, this filtering method is flawed for many reasons. First, many unsolicited e-mail do not contain the filtered words and are thus delivered to the recipient. Second, some desired e-mail, which the recipient expects or wants to receive, may include the filtered words and thus may be filtered out. Accordingly, even if the filtering system correctly filters some unsolicited e-mail, the recipient must nevertheless review the entire set of filtered e-mail to determine whether any desired e-mail has been filtered out. Third, not only must the recipient spend time double-checking for erroneously filtered e-mail, the recipient may spend a significant amount of time setting up and maintaining the filtering system. Fourth, even if a recipient had the time to maintain the filters, many recipients lack the technical knowledge to be capable of (or to be comfortable with) managing this type of filtering system.

BRIEF SUMMARY OF EMBODIMENTS OF THE INVENTION

A need therefore exists for systems and methods that reduce the above-described disadvantages and/or other disadvantages.

In one embodiment, one or more system users may maintain contact information about one or more contacts. The contact information may indicate that the system user does not wish to receive any electronic messages from a contact. The contact information may indicate that the system user wishes to receive all electronic messages from a contact. The contact information may include any suitable information about a contact, such as, for example, a name, mailing address, telephone number, or the like. The contact information may include a history of communications from a contact. The contact information may include a history of communications to a contact.

In one embodiment, an electronic messaging management application may access this contact information to make decisions regarding how to process incoming electronic messages, such as, for example, whether a challenge-response process should be initiated, whether an electronic message should be delivered, whether an electronic message should be delayed, whether an electronic message should be deleted, or the like. For example, if one system user has recorded detailed information about a contact, the contact may not be a sender of bulk emails because such senders may prefer to hide any details of their identities. Also, as an example, if one system user has indicated in the contact information a desire to receive an electronic message from a contact, the contact may not be a sender of bulk emails because many system users prefer not to receive bulk electronic messages. Also, as another example, if the contact information indicates that the sender has successfully completed a challenge-response process for a system user other than an intended recipient, the contact may not be a sender of bulk emails because such senders may prefer not to complete a challenge-response process. Thus, in these and in any other suitable way, the electronic messaging management application may access any suitable contact information to make decisions regarding how to process incoming electronic messages.

An electronic messaging management application may also access contact information maintained by the intended recipient of the electronic message, contact information maintained by one or more system users other than the intended recipient, contact information maintained by two or more system users, or any suitable combination thereof.

An electronic messaging management application may further access contact information maintained by the intended recipient of the electronic message and by one or more system users in a contact chain of the intended recipient.

For purposes of summarizing, some aspects, advantages, and novel features have been described above. Of course, it is to be understood that not necessarily all such aspects, advantages, or features will be embodied in any particular embodiment of the invention. Further, embodiments of the invention may comprise aspects, advantages, or features other than those that have been described. For example, some aspects, advantages, or features of embodiments of the invention may become more fully apparent from the following description and appended claims or may be learned by the practice of embodiments of the invention as set forth in this disclosure.

BRIEF DESCRIPTION OF THE DRAWINGS

To further clarify the above and other advantages and features of embodiments of the present invention, a more particular description will be rendered by reference to specific embodiments thereof which are illustrated in the appended drawings. It is appreciated that these drawings depict only typical embodiments of the invention and are therefore not to be considered limiting of its scope. Certain embodiments of the invention will be described and explained with additional specificity and detail through the use of the accompanying drawings in which.

DETAILED DESCRIPTION OF THE PREFERRED EMBODIMENTS

Figure 1A:
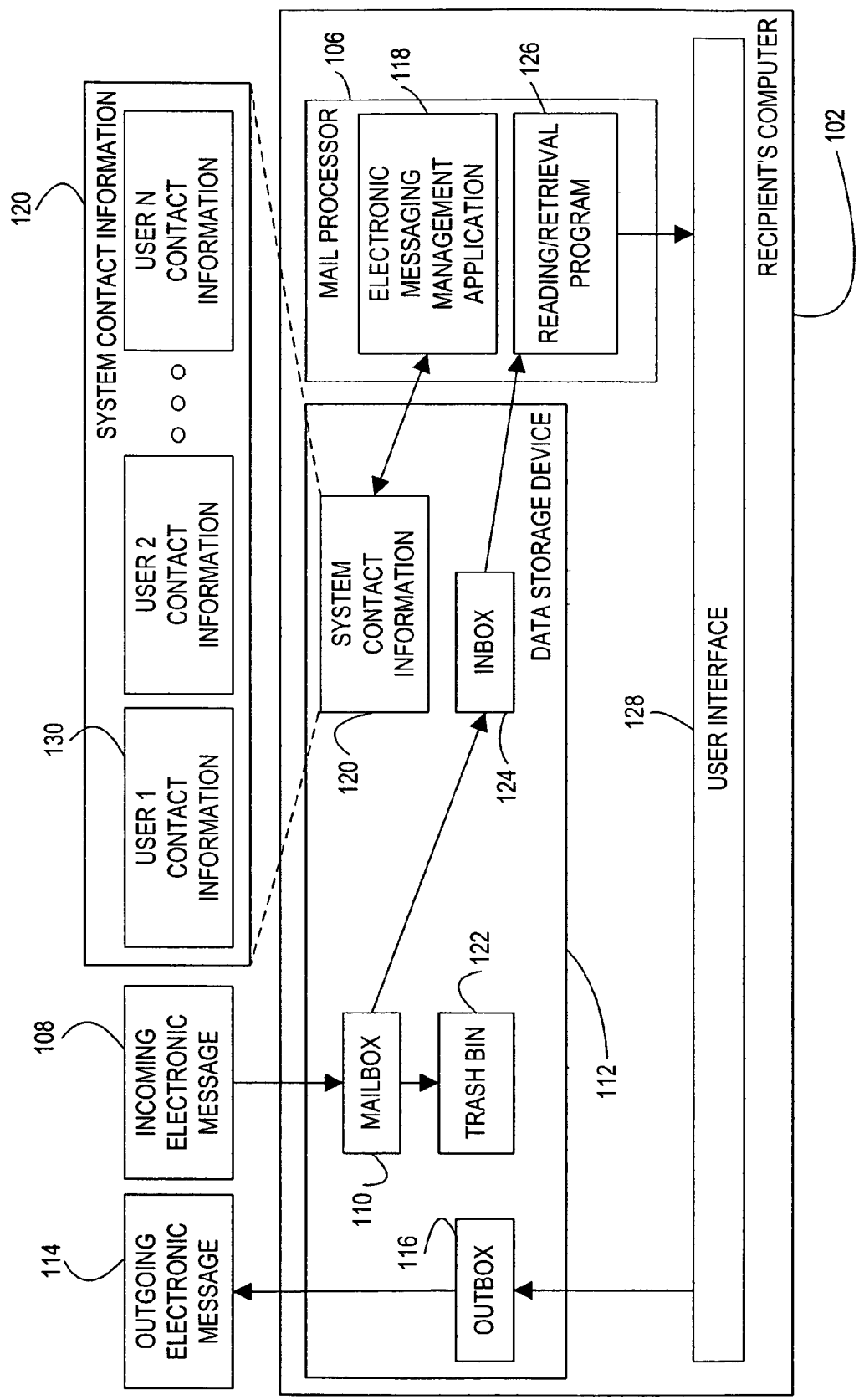
FIG. 1A is a block diagram of a recipient computing system for processing electronic messages according to an embodiment of the invention.

Embodiments of the present invention may include both methods and systems for management of electronic messages. Certain embodiments may help to reduce the number of unsolicited or unwanted electronic messages received by recipients.

As discussed herein, contact information may be used in making decisions on how to process an incoming electronic message. Thus, in some embodiments, a system or method may access certain contact information and may determine—based at least in part upon the content of the contact information—to deliver the electronic message to an intended recipient, to delay the delivery of the electronic message to the intended recipient, to delete the electronic message, to initiate a challenge-response process, or process the electronic message in any other suitable manner. Because accessing the contact information often can be performed without prompting the intended recipient and without prompting the sender of the electronic message, a system or method need not prompt (or otherwise burden) the sender or the intended recipient. Further, because a system often can generate contact information for various purposes and system users typically maintain contact information for personal and business uses, a system or method may determine how to process an electronic message with less additional effort for an intended recipient. Of course, a system and method may use any suitable contact information, including contact information that is not generated by a system and/or not maintained for personal or business uses. Further, a system or method may prompt the intended recipient, the sender of the electronic message, or both in determining how to process an electronic message—depending upon, for example, the intended purpose of the system or method.

As used in the context of this disclosure, the terms "electronic messaging" and "electronic messages" are broad terms, and are used in their ordinary meaning, and include any form of sending a message electronically including, but not limited to, e-mail; instant messaging; telephone; voicemail; facsimile; paging; mobile phone text messaging; forms of electronic communication that use a recipient identifier (e.g., recipient's address); forms of electronic communication that use a sender identifier (e.g., a sender's address);forms of electronic communication that use a sender identifier and a recipient identifier; or the like. For sake of simplicity, the following overview of electronic messaging is described in the context of e-mail sent over the Internet.

A brief review of an embodiment of an electronic mailing system over the Internet is provided as follows: Generally, a sender's computer may send an e-mail to a recipient's computer. The e-mail may be routed through one or more simple mail transfer protocol (SMTP) servers before arriving at a server associated with the recipient's computer. The email may be routed in any other suitable way. The server associated with the recipient's computer may be a server residing on a local area network with the recipient's computer, a server that recipient's computer accesses via a modem pool or with another Internet connection, a web server that provides web-based electronic messaging services to the recipient's computer, a server that operates with the recipient's computer in any other suitable network configuration, or any other suitable computing device. To initiate transmission of the e-mail to the recipient, the sender may address the e-mail using the recipient's e-mail address, which may be input manually, automatically, or in any other suitable manner. Such recipients may be direct recipients (often designated in a "to:"

field), indirect recipients (often designated in "cc:", or carbon copy fields or "bcc:", or blind carbon copy fields), or any other suitable type of recipient. Recipient's e-mail addresses may be obtained by the sender in any of a variety of manners. Senders of unwanted e-mail often obtain the recipient's e-mail address from bulk mailing lists. The recipient's computer may comprise any suitable hardware, software, or the like. In one embodiment, the recipient's computer includes a data storage device, a mail processor (such as an application that processes the e-mail), and one or more applications (such as a calendaring program, a contacts program, or the like). The data storage device may store data used by the mail processor, by the applications, or both. A software package may combine the mail processor with the applications to perform mail processing, other data management functions, or any other suitable function.

As described in further detail below, processes according to embodiments of invention may include various processes for managing electronic messages and/or any other suitable functions. These processes may take place among one or more suitable locations including, but not limited to, a recipient's computer, a server associated with a recipient's computer, one or more other computers, one or more other computing devices, or the like.

Figure 1B:
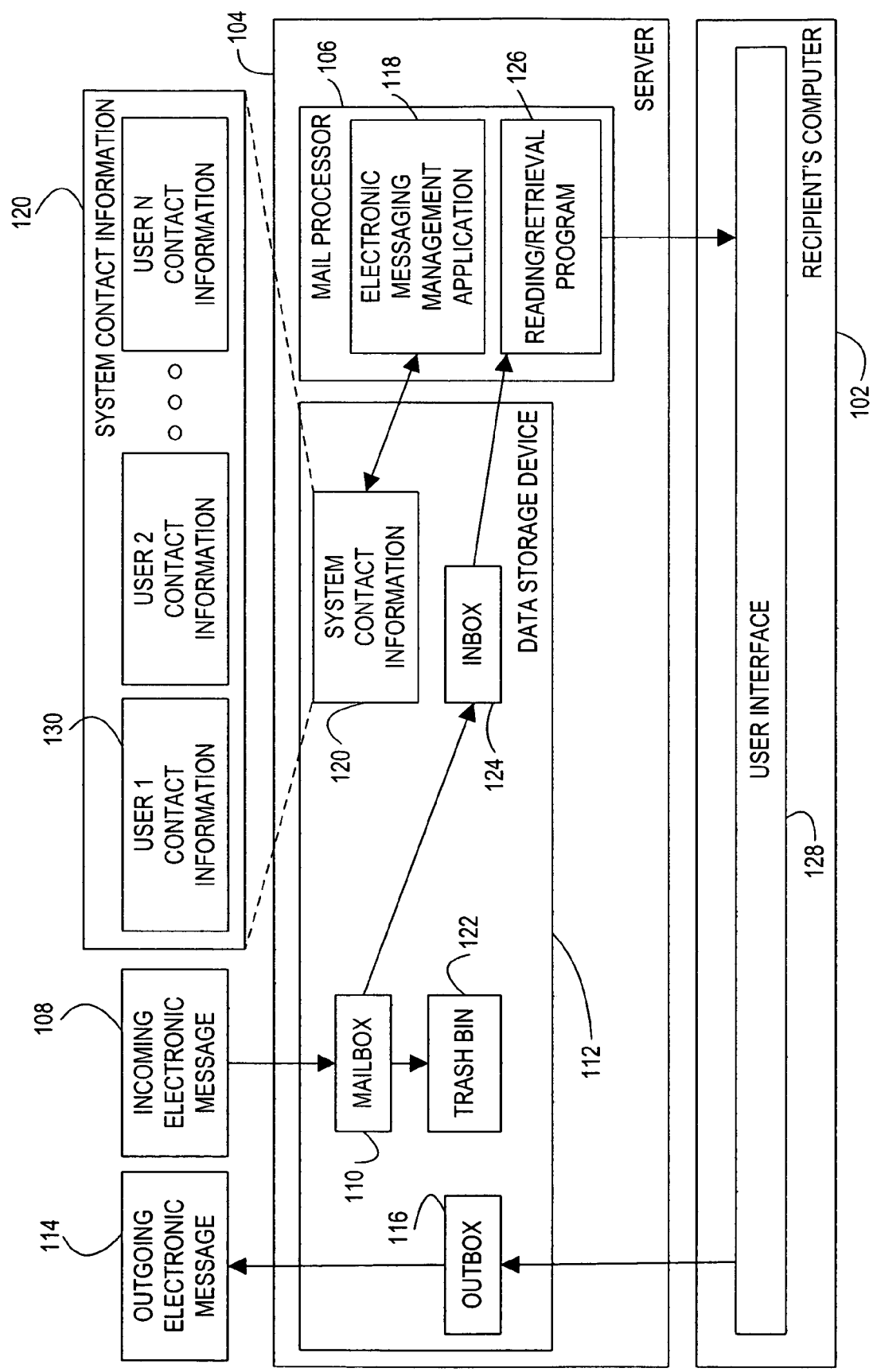
FIG. 1B is a block diagram of a server computing system for processing electronic messages according to an embodiment of the invention.

FIG. 1A is a block diagram illustrating an exemplary embodiment of a recipient's computer 102 that may process electronic messages. FIG. 1B is a block diagram illustrating an exemplary embodiment of a server 104 that may process electronic messages.

As shown in FIG. 1A, the recipient's computer 102 may include a mail processor 106. The mail processor 106 may examine and process one or more incoming electronic messages 108, which may be stored at a mailbox 110 of a data storage device 112. An electronic message may include one or more identifiers. For example, the incoming electronic message 108 may include a recipient identifier (such as a recipient address, a recipient login name, a recipient chat name, a recipient e-mail address, a recipient telephone number, or the like). The incoming electronic message 108 may include a sender identifier (such as a sender address, a sender login name, a sender chat name, a sender e-mail address, a sender telephone number, or the like). The mailbox 110 may advantageously hold an incoming electronic message 108 until the incoming electronic message 108 is processed or until any other suitable event or time. The mail processor 106 may examine and process one or more outgoing electronic messages 114, which may be transmitted from an outbox 116 of the data storage device 112.

As shown in FIG. 1A, the recipient's computer 102 may comprise an electronic messaging management application 118. In one embodiment, the electronic messaging management application 118 may access some or all of the system contact information 120 to make decisions regarding how to process electronic messages, such as, for example, whether a challenge-response process should be initiated, whether a certain electronic message should be delivered, whether a certain electronic message should be delayed, whether a certain electronic message should be deleted, or the like. The electronic messaging management application 118 may provide these and/or any other suitable features, depending on the intended use of the electronic messaging management application 118.

In one embodiment, the electronic messaging management application 118 may access the system contact information 120 to determine whether an electronic message should be delivered to a recipient. If an electronic message should not be delivered, the electronic message may be sent to a trash bin 122, may be deleted, or may be processed in any other suitable fashion. If an electronic message should be delivered, the electronic message may be sent to an inbox 124 or to any other suitable location (such as a folder, a box, or the like). The electronic messaging management application 118 may access some or all of the system contact information 120 to make decisions regarding how to manage electronic messages. Of course, the electronic messaging management application 118 need not access the system contact information 120 to make decisions regarding how to manage electronic messages.

A reading/retrieval program 126 may access one or more electronic messages from the inbox 124 to provide the electronic messages to a user interface 128. The user interface 128 may advantageously allow a recipient system user to interact with one or more of the mail processor 106, the electronic messaging management application 118, the system contact information 120, or any other suitable components. For example, in one embodiment, through user interface 128, the recipient may access and/or manipulate one or more electronic messages, some or all of the contact information, or any other suitable data structure or data.

As shown in FIG. 1A, the electronic messaging management application 118 may be integrated into the mail processor 106. Of course, the electronic messaging management application 118 may be separate from and interact with the mail processor 106.

As shown in FIG. 1B, the electronic messaging management application 118 may be integrated into a mail processor 106 on the server 104. In one embodiment, the electronic messaging management application 118 may be separate from (and interact with) the mail processor 106 on the server 104. As illustrated, a recipient's computer 102 may include a user interface 128 as an interface between the recipient and the server 104. In embodiment, one or more methods performed by server 104 may be operated according to an application service provider (ASP) model hosted by the server 104. In one embodiment, the recipient computer 102 accesses one or more methods performed by server 104 over the Internet via an application service provider (ASP) model hosted by an Internet server. Of course, functionality may be accessed in any other suitable fashion.

As illustrated in FIGS. 1A and 1B, the electronic messaging management application 118 may be implemented in any of a variety of ways and/or in a variety of locations. For example, in one embodiment, some or all of the electronic messaging management application 118 may be integrated into a computer operating system. In one embodiment, some or all of the electronic messaging management application 118 may be implemented using commands and/or functionality that a mail processor natively supports. Further, in one embodiment, the electronic messaging management application 118 may cause a mail processor to execute commands and/or functionality that the mail processor natively supports. Some or all of the electronic messaging management application 118 may be implemented using one or more functional components written in computer-executable code that is separate from a mail processor, but interfaces with a mail processor. Of course, the electronic messaging management application 118 need not use (nor be implemented using) any component of a mail processor. Some, all, or none of the electronic messaging management application 118 may be integrated into a mail processor, depending on the intended use and purpose of the electronic messaging management application 118. Some or all of the electronic messaging management application 118 may be installed in any one or more suitable locations, including but not limited to the server 104, the recipient's computer, other computers, other computer devices, or the like. The electronic messaging management application 118 may be embodied in any suitable form. Of course, the electronic messaging management application 118 is optional and not required.

As shown in FIGS. 1A and 1B, the electronic messaging management application 118 may access the system contact information 120. In some embodiments, the electronic messaging management application 118 may determine—based at least in part upon the content of the system contact information 120—how an incoming electronic message should be processed. "System contact information" is a broad term, and is used in its ordinary meaning, and includes, but is not limited to, the "contact information" maintained by one or more systems, one or more system users, or any suitable combination thereof. "Contact information" is a broad term, and is used in its ordinary meaning, and includes, but is not limited to, any form of suitable information that may be maintained about a contact (such as a person, a group of persons, a legal entity, or the like)—including, but not limited to, any suitable number or combination of the following: a first name, a middle name, a middle initial, a last name, nicknames, an entity name, physical addresses, mailing addresses, a state of incorporation, e-mail addresses, telephone numbers, telephone numbers and/or identifiers (including home, work, mobile, facsimile, voicemail, pager, or the like), job titles, uniform resource locators (URLs), worldwide-web page addresses, a birth date, names of employees, titles of employees, names of family members, information about family members, and history of interaction with a contact (such as communications, events, or the like).

In one embodiment, a system may automatically add, edit, or delete contact information. For example, in one embodiment, a system may add, edit, or delete contact information when an electronic message to the contact is created using the system, when an electronic message is sent to the contact using the system, when an electronic message is received from the contact using the system, and/or when an event is scheduled using the system. A system may also add, edit, or delete contact information in response to initiating a challenge-response process, receiving a response in a challenge response procedure, failing to receive a timely response in a challenge response procedure, failing to receive a correct response in a challenge response procedure, failing to receive a timely and correct response in a challenge response procedure, or the like. A system may further add, edit, or delete contact information in response to importing contact information from an external system. A system may also automatically access contact information from an external system and/or access contact information from an external system in response to user input. Of course, a system may automatically add, edit, or delete contact information in any suitable manner and at any suitable time and/or in response to any suitable event. Further, a system need not be able to automatically add, edit, or delete contact information.

In one embodiment, a system user may change (e.g., add, edit, or delete) contact information. For example, a system user can change contact information manually. A system user may also change contact information using an importation feature. For example, an external system may have contact information that may advantageously be imported into a user's system. Of course, a system user may change contact information in any suitable manner and at any suitable time and/or in response to any suitable event. Further, a system user need not be able to change contact information.

As shown in FIGS. 1A and 1B, the system contact information 120 may comprise contact information associated with one or more system users. For example, the system contact information 120 may comprise user contact information (such as user contact information 130) of some or all of a set of system users. The user contact information may include contact information that a particular system user maintains and that describes one or more contacts.

In one embodiment, the user contact information of a system user may be accessed by a single system user. Alternatively, the user contact information of a system user may be accessed by the single system user and by one or more system administrators; or by the system user and any other system user to whom the system user granted access rights. In one embodiment, the user contact information of a single system user may be accessed by a set of system users. Of course, user contact information may be accessed, added, edited, or deleted in any suitable manner and by any suitable number of system users.

Figure 2:
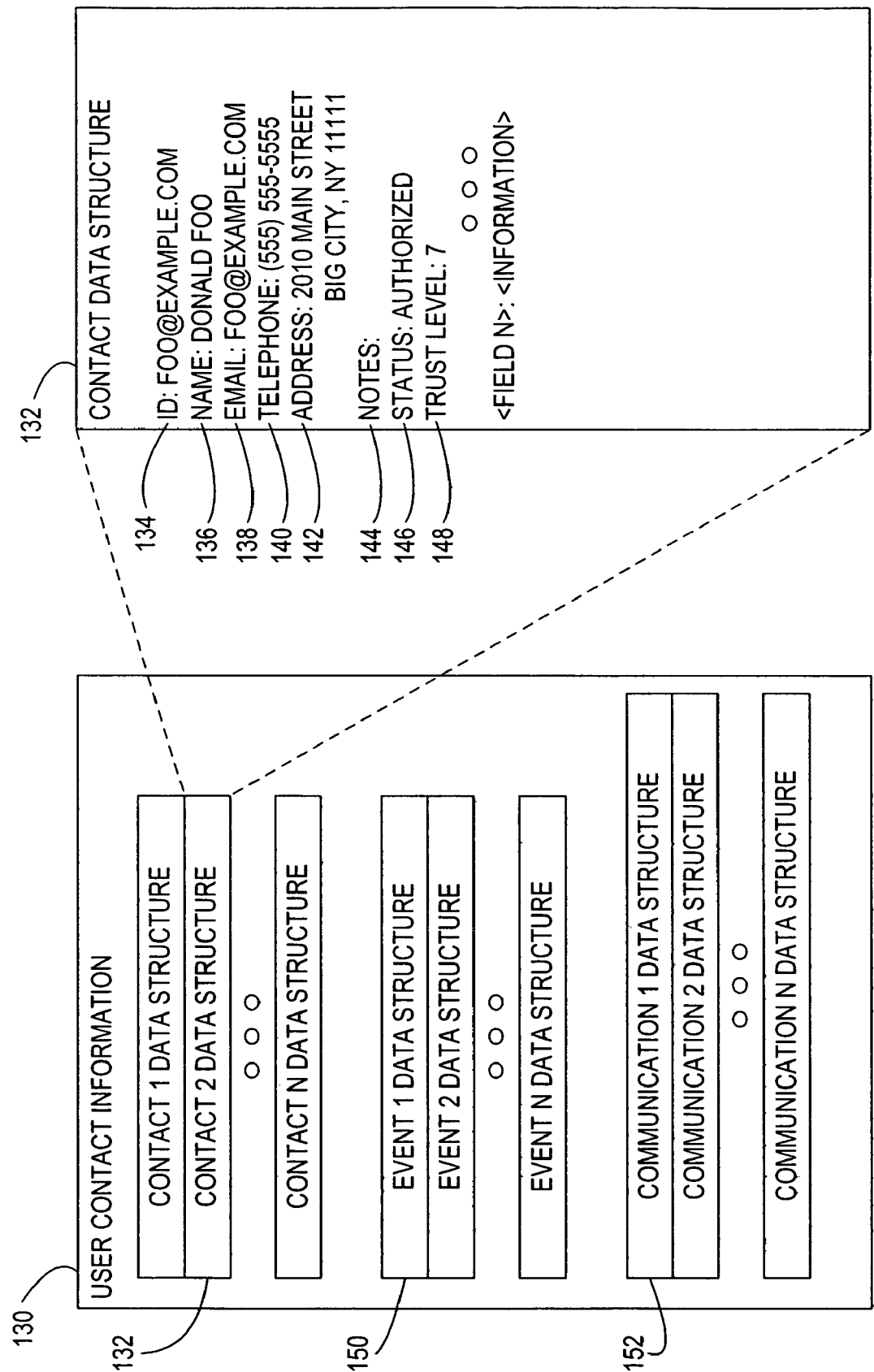
FIG. 2 is a block diagram of a exemplary set of contact information that may be used for processing electronic messages according to an embodiment of the invention.

FIG. 2 is a block diagram of a exemplary set of contact information according to an embodiment of the invention. As shown in FIG. 2, the user contact information 130 may include a set of one or more data structures containing contact information. In one embodiment, the user contact information 130 includes a set of one or more contact data structures, such as a contact data structure 132. The contact data structure 132 may include any form of suitable information that may be maintained about a contact. In one embodiment, the contact data structure 132 may include a series of fields that may have associated information. In one embodiment, the fields may include one or more of the following: an identifier 134, a name 136, an email address 138, a telephone number 140, notes 144, a status 146, a trust level 148, and any other suitable field. In one embodiment, the identifier 134 may comprise any suitable value, certificate, key, code, text, or the like that may be used to identify the sender of the electronic message, such as an address, a login name, a chat name, an e-mail address, a telephone number, a telephone identifier, an arbitrarily generated key, or the like). In one embodiment, a sender of an electronic message includes an identifier with the electronic message, which identifier may be compared to the identifier 134 to determine whether the contact data structure 132 is associated with the sender of the electronic message. Determining whether the contact data structure 132 is associated with the sender of the electronic message may be done in any other suitable fashion and using any other suitable contact information. Of course, the contact data structure 132 may have any other suitable fields and need not have any of the illustrated fields.

In one embodiment, an identifier 134 may comprise an identifier that identifies a group of persons, a group of legal entities, or the like. In one embodiment, the identifier may identify a domain name. For example, an identifier 134 for an entire domain name may comprise "example.com" or "*@example.com" or any other suitable identifier. In one embodiment, a contact for a domain name may be treated as a contact for a sender of an electronic message using that domain name. Similarly, an identifier may identify any portion of any suitable identifier, such as a telephone number. Thus, for example, an identifier may be an area code in one embodiment. In one embodiment, a contact for an area code may be treated as a contact for a sender of an electronic message using that area code.

In one embodiment, the system contact information 120 may include a data structure that may indicate (1) any electronic message from a sender is "authorized" for delivery, (2) any electronic message from a sender is "unauthorized" for delivery, (3) an "unconfirmed" status as to whether any electronic message from a sender should be delivered, (4) any other suitable indication, or any combination thereof, such as the data structures described in U.S. patent application Ser. No. 10/174,561, filed Jun. 18, 2002 and entitled PRACTICAL TECHNIQUES FOR REDUCING UNSOLICITED ELECTRONIC MESSAGES BY IDENTIFYING SENDER'S ADDRESSES, which is incorporated by reference herein.

As shown in FIG. 2, the user contact information 130 may include a set of one or more event data structures, such as an event data structure 150. In one embodiment, the event data structure 150 may include information about an event (such as a meeting, an appointment, or the like) and one or more contacts associated with the event. Of course, the event data structure 150 may comprise any other suitable information.

As shown in FIG. 2, the user contact information 130 may include a set of one or more communication data structures, such as a communication data structure 152. In one embodiment, the communication data structure 152 may comprise one or more of an electronic message sent to a contact, an electronic message received from a contact, a history of one or more electronic messages sent to a contact, a history of one or more electronic messages received from a contact, an email sent to a contact, and an email received from a contact. Of course, the communication data structure 152 may comprise any other suitable information.

Although (as illustrated in FIG. 2) the user contact information 130 may include a set of one or more event data structures (such as the contact data structure 132, the event data structure 150, and the communication data structure 152, or the like), the illustrated data structures are merely exemplary embodiments. Each of the contact data structure 132, the event data structure 150, and the communication data structure 152 is optional. The user contact information 130 may be stored using any other suitable data structure or system. The user contact information 130 may be stored and/or organized in any other suitable manner.

Figure 3:
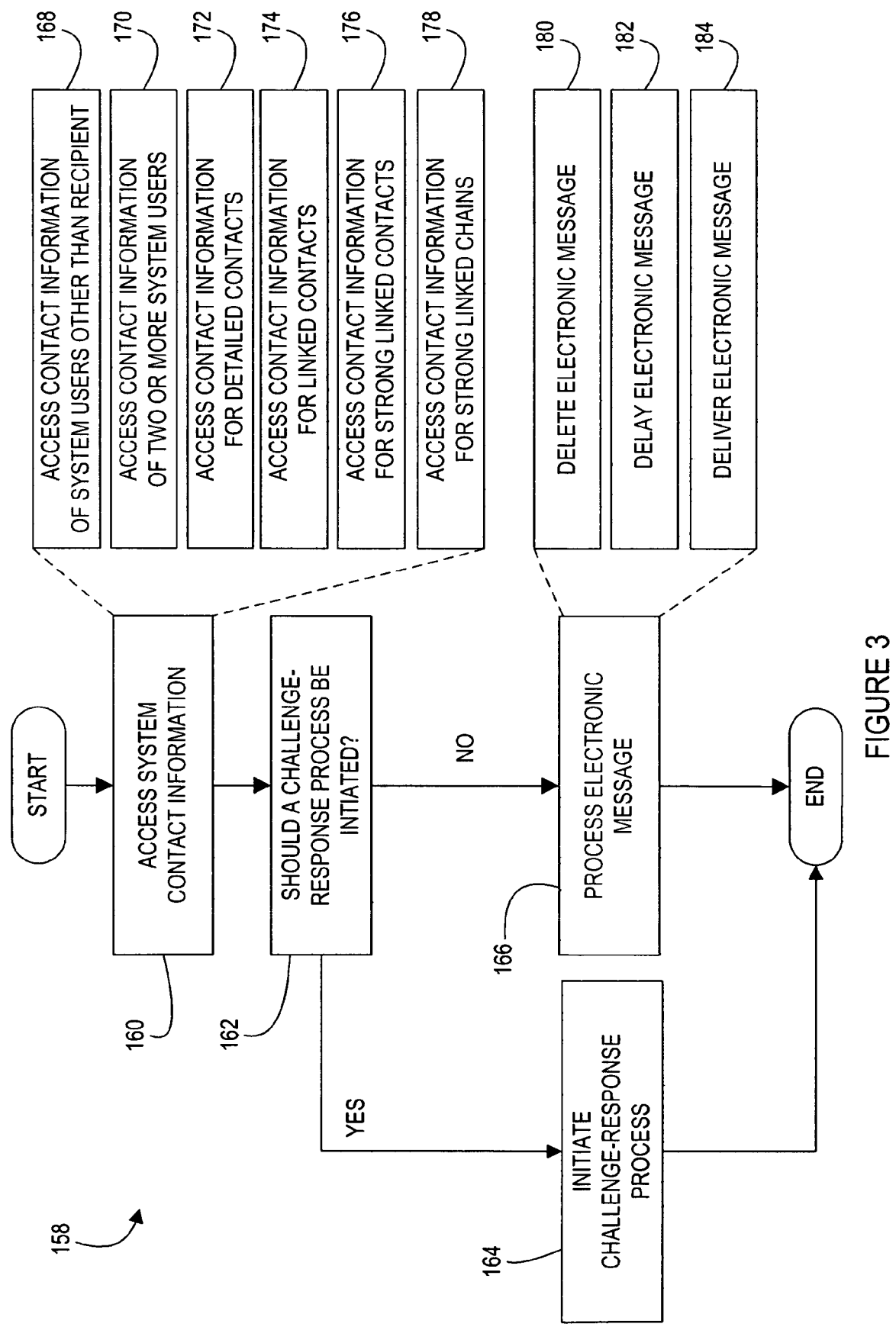
FIG. 3 is a flowchart of illustrating a method that may be used for processing electronic messages according to an embodiment of the invention.

FIG. 3 is a flowchart illustrating an exemplary embodiment of a method 158 that may be performed by one or more suitable components or systems, such as the electronic messaging management application 118, the mail processor 106, the reading/retrieval program 126, or the like. The method 158 may be used for managing the delivery of an electronic message or for any other suitable purpose.

At a block 160 in FIG. 3, the method 158 may access (and examine the content of) at least a portion of the system contact information 120. As discussed below, the method 158 may then use the content of the system contact information 120 and/or any other appropriate information to make decisions about how an electronic message should be processed (such as, whether a challenge-response process should be initiated at a block 162, how an electronic message should be otherwise processed at a block 166, and the like).

As shown in FIG. 3, at the block 162, the method 158 may determine whether a challenge-response process should be initiated. In one embodiment, at the block 162, the method 158 may determine whether a challenge-response process should be initiated at least in part based upon the content of the system contact information 120, which was accessed at the block 160. Any suitable challenge-response process may be used. For example, in one embodiment of a challenge-response process, the electronic messaging management application 118 may initiate a challenge-response process by sending one or more challenge messages to a sender of the electronic message. The challenge messages may (for example) request one or more responses from the sender of the electronic message; from one or more software programs associated with the electronic message and/or associated with the sender of the electronic message; from one or more computers or other computing devices associated with the electronic message and/or associated with the sender of the electronic message; or may request any other suitable response in any suitable form. If the electronic messaging management application 118 receives a satisfactory response, the electronic message may be delivered to one or more intended recipients or may be otherwise processed in any other suitable manner. If the electronic messaging management application 118 does not receive a satisfactory response, the electronic message may be deleted or otherwise processed in any other suitable manner. Any of a variety of other challenge-response processes, protocols, and/or systems may be used.

Exemplary embodiments of some challenge-response processes, protocols, and/or systems are described in U.S. Pat. No. 6,199,102; U.S. Pat. No. 6,112,227; U.S. patent application Ser. No. 10/841,767, filed May 7, 2004 and entitled MANAGING ELECTRONIC MESSAGES, which claims priority to and the benefit of U.S. Provisional Patent Application Ser. No. 60/469,199, filed on May 9, 2003 and entitled AUTOMATED TECHNIQUES FOR CONFIRMING THE SENDER OF AN ELECTRONIC MESSAGE; and U.S. patent application Ser. No. 10/174,561, filed Jun. 18, 2002 and entitled PRACTICAL TECHNIQUES FOR REDUCING UNSOLICITED ELECTRONIC MESSAGES BY IDENTIFYING SENDER'S ADDRESSES; the disclosures of each of which are hereby incorporated by reference herein.

As shown in FIG. 3, if, at the block 162, the method 158 determines that a challenge-response process should be initiated, the method may proceed to a block 164, where a challenge-response process may be initiated. If, at the block 162, the method 158 determines that a challenge-response process should not be initiated, the method may proceed to a block 166, where the electronic message may be processed. In one embodiment, at the block 166, the method 158 may determine how an electronic message is processed at least in part based upon the content of the system contact information 120, which was accessed at the block 160.

In one embodiment, the system contact information 120 may comprise one or more instances of user contact information 130 that may include contact information for the sender of the electronic message. For example, one system user may maintain a contact data structure (such as the contact data structure 132) for the sender of the electronic message, while another system user may maintain another contact data structure for the sender of the electronic message. Advantageously, both users may collect contact information customized to their own intended use.

Thus, at the block 160 in FIG. 3, the method may access any suitable portion or portions of the system contact information 120. For example, the method 158 may access the user contact information 130 of the recipient of the electronic message, the user contact information 130 of one or more system users other than the recipient of the electronic message, as illustrated in block 168, the user contact information 130 of two or more system users, as illustrated in block 170, the user contact information 130 of the recipient of the electronic message and at least one system user other than the recipient of the electronic message, and the like. The method 158 may examine the content of the accessed user contact information 130 and/or any other appropriate information to make decisions about how an electronic message should be processed at the block 162 and/or at the block 166.

In one embodiment, to make decisions about how an electronic message should be processed at the block 162 and/or at the block 166, the method 158 may optionally consider instances of user contact information 130 having a desired amount of detail (or information) for the sender of the electronic message, as illustrated in block 172. The amount of information may be assessed using any suitable method and using any number of suitable factors. In one embodiment, one factor may be the number of (and/or existence of) fields into which the user has manually entered information about the sender. In one embodiment, one factor may be the number of (and/or existence of) particular fields having associated information about the sender. In one embodiment, one factor may be whether the contact information includes contact information for fields other than those typically sent with the type of received electronic message. For example, e-mail typically includes an e-mail address, but does not typically include other information (such as, for example, nicknames, physical addresses, mailing addresses, telephone numbers and/or identifiers, job titles, a birth date, names of family members, information about family members, or the like). Accordingly, in one embodiment, at the block 160, the system may access instances of user contact information 130 in which one or more of the following is maintained for the sender of the electronic message: a nickname, a physical address, a mailing address, a telephone number and/or identifier, a job title, a birth date, a name of a family member, or information about a family member. Of course, the requisite level of detail may be established for an entire set of system users, may be established for groups of one or more system users, may be established for an individual system user (such as, the recipient of the electronic message), or may be established according to any other suitable groups of one or more system users. Further, the method 158 may consider any instances of user contact information 130 without respect to any level of detail for the sender of the electronic message.

To make decisions about how an electronic message should be processed at the block 162 and/or at the block 166, the method 158 may optionally consider instances of user contact information 130 of those system users having a link with (or association with) the recipient of the electronic message, as illustrated in block 174 of FIG. 3. In one exemplary embodiment, the method the method 158 may optionally consider instances of user contact information 130 of those system users for whom the recipient of the electronic message maintains contact information, using, for example, a contact data structure (such as, the contact data structure 132) or the like.

To make decisions about how an electronic message should be processed at the block 162 and/or at the block 166, the method 158 may optionally consider instances of user contact information 130 of those system users in a contact chain. In one example, where the recipient system user "A" maintains contact information for a system user "B" and the system user "B" maintains contact information for a system user "C," a contact chain exists from "A" to "B" to "C." According to this example, the method 158 may access at the block 160 (and consider at the block 162) the instances of user contact information 130 of system user "B" and "C." The method 158 may also access at the block 160 (and consider at the block 162 and/or at the block 166) the user contact information 130 of the recipient of the electronic message. In one embodiment, a link in contact chain may comprise one or more selected system users selected by a system user—regardless of whether the system user maintains any contact information about the selected system users. It will be appreciated that a recipient may have no contact chains or may have any suitable number of contact chains of any suitable lengths.

To make decisions about how an electronic message should be processed at the block 162 and/or at the block 166, the method 158 may optionally consider instances of user contact information 130 of those system users within a "link limit," that is, a number of links in a contact chain. If a contact chain exists from system users "A" to "B" to "C" to "D," the system user "B" is one link away from the recipient "A" in the chain, the system user "C" is two links away from the recipient "A," and the system user "D" is three links away from the recipient "A." Thus, if, according to one exemplary embodiment, the link limit is two links, the method 158 may consider the user contact information 130 of the system users "B" and "C," but not the user contact information 130 of the system user "D"— who is three links away from the recipient "A." In one embodiment, the link limit is one. In one embodiment, the link limit is three. The link limit may be any other suitable number. Of course, the method 158 may consider any instances of user contact information 130 without respect to whether a system user is in a contact chain or whether a system user is within a number of links in a contact chain.

To make decisions about how an electronic message should be processed at the block 162 and/or at the block 166, the method 158 may optionally consider instances of user contact information 130 of those system users that are in a contact chain of the recipient in which each link of the contact chain is at or above a strength level limit, as illustrated in block 176 of FIG. 3. A strength level may be a trust value (such as the field 148 in FIG. 2) associated with a contact. In one embodiment, a system user may manually enter a trust value indicating the trustworthiness of the contact, the strength of his or her relationship with the contact, or the like. The strength value may be a value generated by the system using any suitable factor, such as, the number of communications from the contact, the number of communications to the contact, an analysis of the contents of communications to and/or from the contact, the amount of information maintained for the contact, amount of events scheduled with the contact, or the like. In one example, suppose that recipient system user "A" maintains contact information for a system user "B" with strength level from A to B of 5 and that the system user "B" maintains contact information for a system user "C" with a strength level from B to C of 4. If, as in one embodiment, a strength level limit is 5, the method 158 may consider the user contact information 130 of "B," but not the user contact information 130 of "C." In one embodiment, the method 158 may optionally consider instances of user contact information 130 of those system users in which each link in contact chain of the recipient has a requisite strength level and those system users are within a number of links in a contact chain. A strength level may be any suitable value, generated by any suitable method, and using any suitable parameters.

To make decisions about how an electronic message should be processed at the block 162 and/or at the block 166, the method 158 may optionally consider instances of user contact information 130 of those system users in which the average strength level the links in a contact chain of the recipient is at or above an average strength level limit, as illustrated in block 178 of FIG. 3. In one example, suppose that recipient system user "A" maintains contact information for a system user "B" with strength level from A to B of 5, that the system user "B" maintains contact information for a system user "C" with a strength level from B to C of 3, and that the system user "C" maintains contact information for a system user "D" with a strength level from B to C of 3. If, as in one embodiment, the average strength level limit is 4, the method 158 may consider the user contact information 130 of system users "B" and "C," but not the user contact information 130 of system user "D." In one embodiment, the method 158 may optionally consider only instances of user contact information 130 of those system users in which the average strength level the links in contact chain of the recipient at or above an average strength level limit and each link in contact chain of the recipient is at or above a strength level limit.

Figure 5:
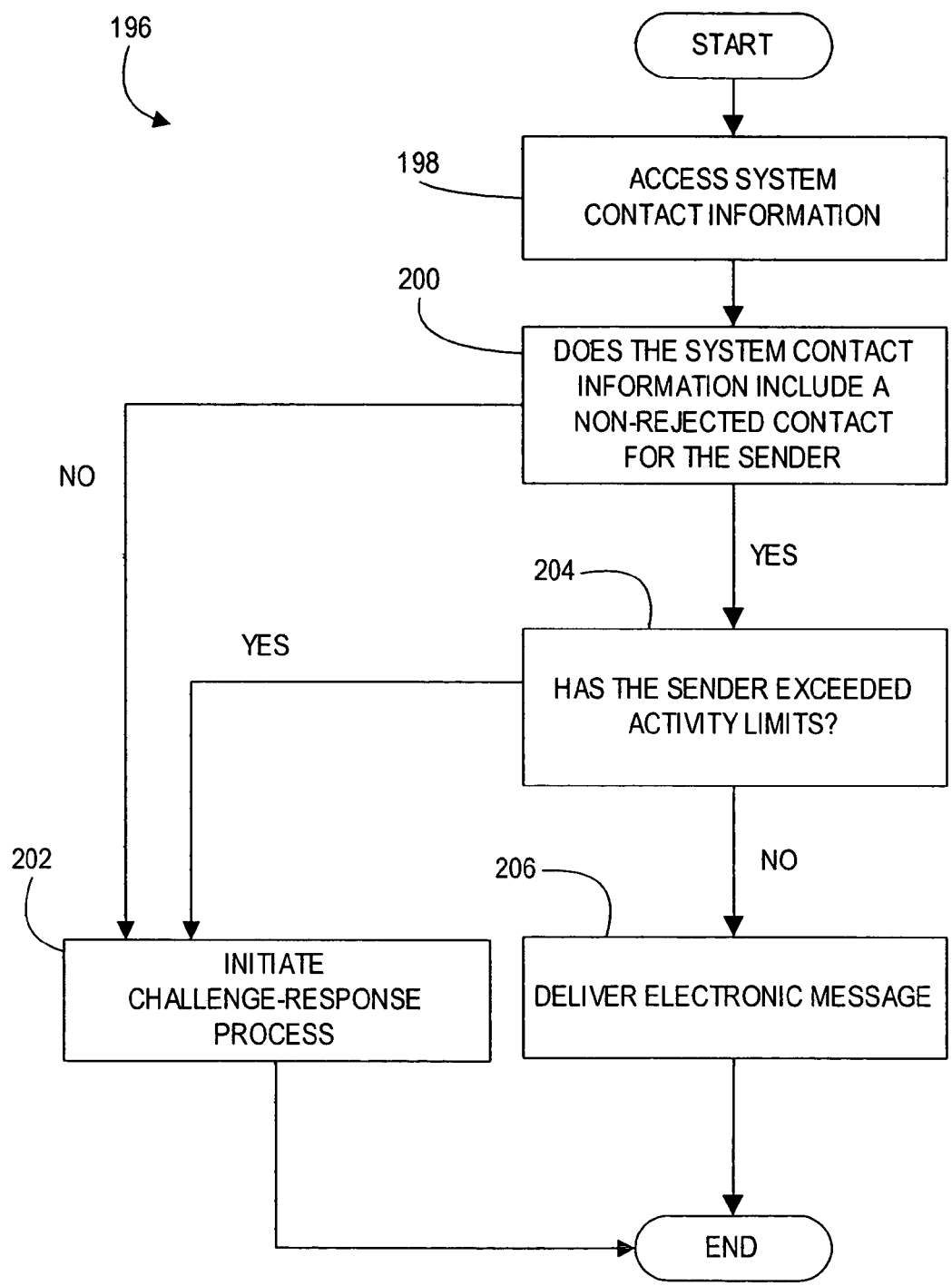
FIG. 5 is a flowchart of illustrating a method that may be used for processing electronic messages according to an embodiment of the invention.

To make decisions about how an electronic message should be processed at the block 162 and/or at the block 166, the method 158 may optionally consider instances of user contact information 130 of those system users in which the total strength level the links in a contact chain of the recipient is at or above a total strength level limit, as illustrated in block 178 of FIG. 5. In one example, suppose that recipient system user "A" maintains contact information for a system user "B" with strength level from A to B of 5, that the system user "B" maintains contact information for a system user "C" with a strength level from B to C of 3, and that the system user "C" maintains contact information for a system user "D" with a strength level from B to C of 3. If, as in one embodiment, the total strength level limit is 8 for two links and 13 for three links, the method 158 may consider the user contact information 130 of system users "B" and "C," but not the user contact information 130 of system user "D."

It will be appreciated that various strength level limits, average strength level limits, and total strength level limits may exist for chains of various lengths, but may be the same for chains of various lengths. Various strength level limits, average strength level limits, and total strength level limits may be established for an entire set of system users, may be established for groups of one or more system users, may be established for an individual system user (such as, the recipient of the electronic message), or may be established according to any other suitable groups of one or more system users. Further, the method 158 may consider any instances of user contact information 130 without respect any strength level limits, average strength level limits, or total strength level limits. Further, the method 158 may consider any instances of user contact information 130 without respect to whether a system user is in a contact chain or whether a system user is within a number of links in a contact chain.

As illustrated in FIG. 3, the method 158 may process the electronic message at the block 166 in any suitable fashion. As discussed, the method 158 may determine how an electronic message is processed at least in part based upon the content of the system contact information 120, which was accessed at the block 160. The method 158 may process the electronic message by deleting the electronic message, as shown in block 180. The method 158 may process the electronic message by delaying the deliver of the electronic message to the recipient, as shown in block 182. For example, in one embodiment, the method 158 may have already issued a challenge-response message to the sender of the electronic message and may delay a second electronic message until the sender sends a suitable response to the challenge-response message. The electronic message may be delayed in any other suitable manner and for any other suitable purpose. The method 158 may also process the electronic message by delivering the electronic message to the recipient, as shown in block 184. The electronic message may be delivered in any suitable manner.

Figure 4:
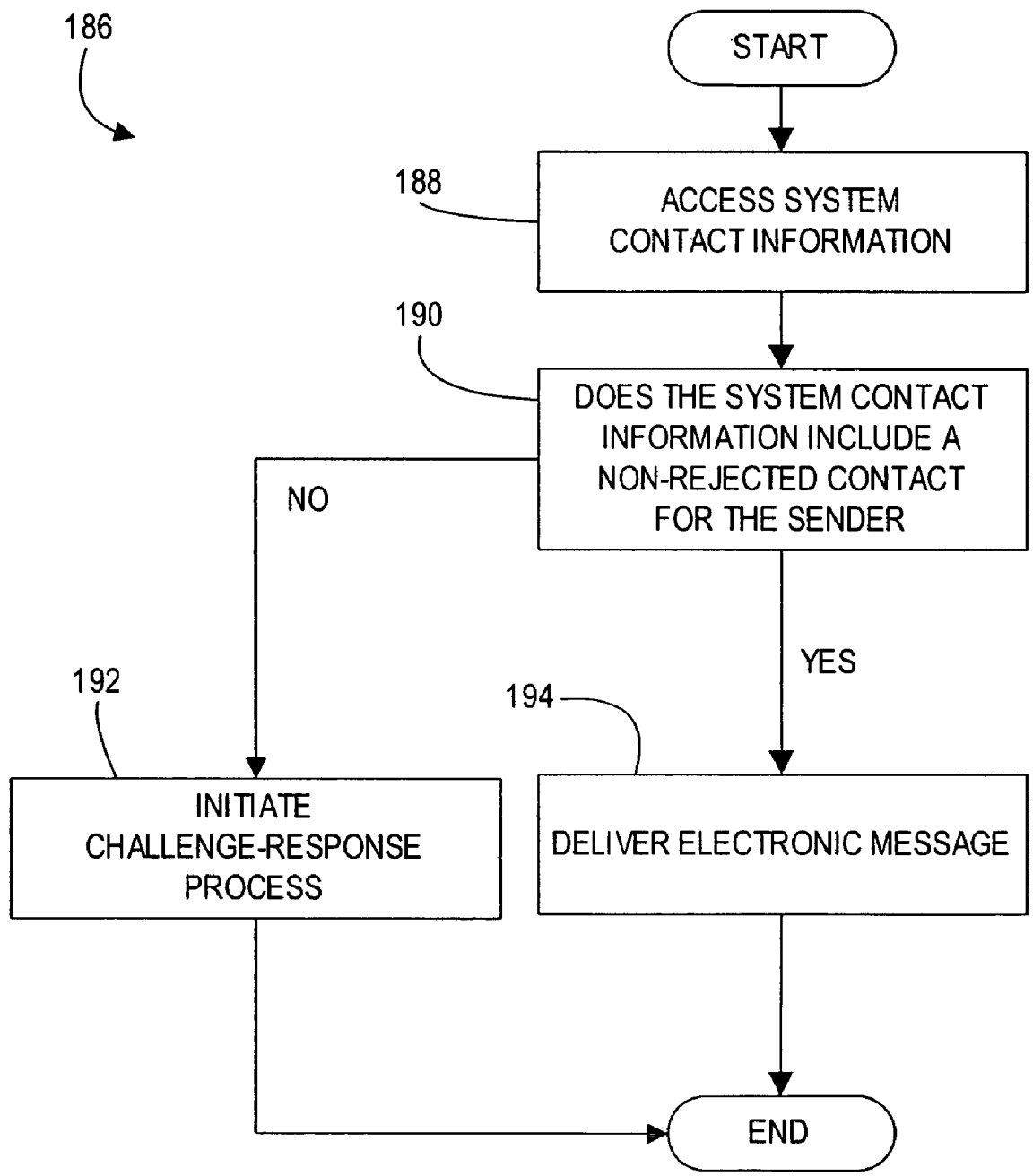
FIG. 4 is a flowchart of illustrating a method that may be used for processing electronic messages according to an embodiment of the invention.

FIG. 4 is a flowchart illustrating an exemplary embodiment of a method 186 that may be performed by one or more suitable components or systems, such as the electronic messaging management application 118, the mail processor 106, the reading/retrieval program 126, or the like. In one embodiment, the method 186 may be advantageously used to manage the delivery an electronic message. Upon receiving an electronic message (which may identify a sender and a recipient), the method 186, at a block 188, may access the system contact information 120. The method 186 may access some or all of the contact information that the method 158 (FIG. 3) may access at the block 160 (FIG. 3)—including blocks 168, 170, 172, 174, 176, and 178 (FIG. 3). The method 186 may then examine the content of the accessed system contact information 120 and/or any other appropriate information to make decisions about how an electronic message should be processed (such as, whether the accessed contact information includes a non-rejected contact for the sender at a block 190, how an electronic message should be otherwise processed at a block 194, and the like).

At the block 190 in FIG. 4, the method 186 may determine whether the accessed system contact information 120 includes at least one instance of a non-rejected contact for the sender of the electronic message. For example, in one embodiment, the user contact information 130 may include a data structure—such as the contact data structure 132 (FIG. 2) with the status field 146 (FIG. 2)—that may indicate (1) that no electronic message from a particular contact should be delivered to the system user, (2) that any electronic message from a particular contact should be delayed pending a response to a challenge message, (3) that any electronic message from a particular contact should be delivered to the system user, (4) any other suitable indication, or any combination thereof. Accordingly, a "non-rejected contact" may be a contact for whom a data structure can indicate (but does not currently indicate) that no electronic message from that contact should be delivered to the system user; and a "rejected contact" may be a contact for whom a data structure does currently indicate that no electronic message from that contact should be delivered to the system user. For example, in one embodiment, the method 186 may determine whether any instance of the user contact information 130 includes a contact data structure (such as the contact data structure 132 in FIG. 2) for the sender of the electronic message. If one or more instances of the user contact information 130 include a contact data structure for the sender, the method may determine whether any of those contact data structures indicates that no electronic message from that contact should be delivered to the system user at the block 190.

If the accessed system contact information 120 does not include at least one instance of a non-rejected contact for the sender of the electronic message, the method 186 may initiate a challenge-response process at a block 192 in FIG. 4. If the accessed system contact information 120 does include at least one instance of a non-rejected contact for the sender of the electronic message, the method 186 may deliver the electronic message at the block 194 or may process the electronic message in any other suitable manner.

FIG. 5 is a flowchart illustrating an exemplary embodiment of a method 196 that may be performed by one or more suitable components or systems, such as the electronic messaging management application 118, the mail processor 106, the reading/retrieval program 126, or the like. In one embodiment, the method 196 may be advantageously used to manage the delivery an electronic message. Upon receiving an electronic message (which may identify a sender and a recipient), the method 196, at a block 198, may access the system contact information 120. The method 196 may access some or all of the contact information that the method 158 (FIG. 3) may access at the block 160 (FIG. 3). The method 196 may then examine the content of the accessed system contact information 120 and/or any other appropriate information to make decisions about how an electronic message should be processed (such as, whether the accessed contact information includes a non-rejected contact for the sender at a block 200, whether the sender has exceeded an activity limit at a block 204, how an electronic message should be otherwise processed at a block 206, and the like).

At the block 200 in FIG. 5, the method 196 may determine whether the accessed system contact information 120 includes at least one instance of a non-rejected contact for the sender of the electronic message.

If the accessed system contact information 120 does not include at least one instance of a non-rejected contact for the sender of the electronic message, the method 196 may initiate a challenge-response process at a block 202 in FIG. 5. If the accessed system contact information 120 does include at least one instance of a non-rejected contact for the sender of the electronic message, the method 196 may determine whether the sender has exceeded an activity limit at the block 204. For example, an activity limit may specify a limit of the number of electronic messages that a sender may send during a time period, such as an average number of messages per hour, a number of messages per twenty-four-hour period, or the like. The activity limit may specify a number of messages without respect to a time period. If the sender of the electronic message has exceeded an activity limit, the method 186 may initiate a challenge-response process at a block 202 or may process the electronic message in any other suitable manner. If the sender of the electronic message has not exceeded any activity limit, the method 196 may deliver the electronic message at the block 206 or may process the electronic message in any other suitable manner.

Figure 6:
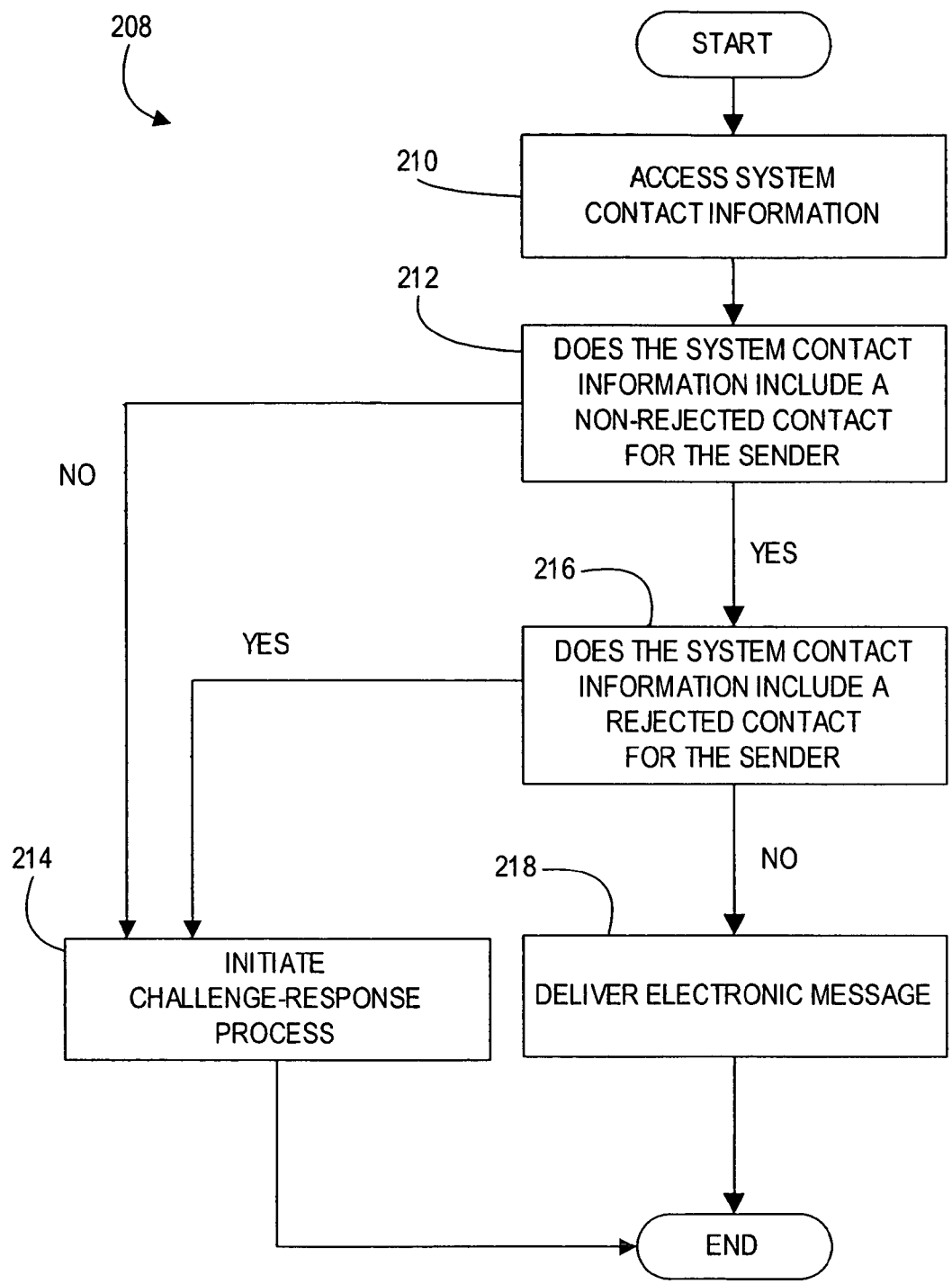
FIG. 6 is a flowchart of illustrating a method that may be used for processing electronic messages according to an embodiment of the invention.

FIG. 6 is a flowchart illustrating an exemplary embodiment of a method 208 that may be performed by one or more suitable components or systems, such as the electronic messaging management application 118, the mail processor 106, the reading/retrieval program 126, or the like. In one embodiment, the method 208 may be advantageously used to manage the delivery an electronic message. Upon receiving an electronic message (which may identify a sender and a recipient), the method 208, at a block 210, may access the system contact information 120. The method 208 may access some or all of the contact information that the method 158 (FIG. 3) may access at the block 160 (FIG. 3). The method 208 may then examine the content of the accessed system contact information 120 and/or any other appropriate information to make decisions about how an electronic message should be processed (such as, whether the accessed contact information includes a non-rejected contact for the sender at a block 212, whether the accessed contact information includes a rejected contact for the sender at a block 216, how an electronic message should be otherwise processed at a block 218, and the like).

At the block 212 in FIG. 6, the method 208 may determine whether the accessed system contact information 120 includes at least one instance of a non-rejected contact for the sender of the electronic message.

If the accessed system contact information 120 does not include at least one instance of a non-rejected contact for the sender of the electronic message, the method 208 may initiate a challenge-response process at a block 214 in FIG. 6. If the accessed system contact information 120 does include at least one instance of a non-rejected contact for the sender of the electronic message, the method 208 may determine whether the accessed system contact information 120 includes at least one instance of rejected contact for the sender of the electronic message at the block 216. If the accessed system contact information 120 does include at least one instance of a rejected contact for the sender of the electronic message, the method 208 may initiate a challenge-response process at a block 214 or may process the electronic message in any other suitable manner. If the accessed system contact information 120 does not include at least one instance of a rejected contact for the sender of the electronic message, the method 208 may deliver the electronic message at the block 218 or may process the electronic message in any other suitable manner.

Figure 7:
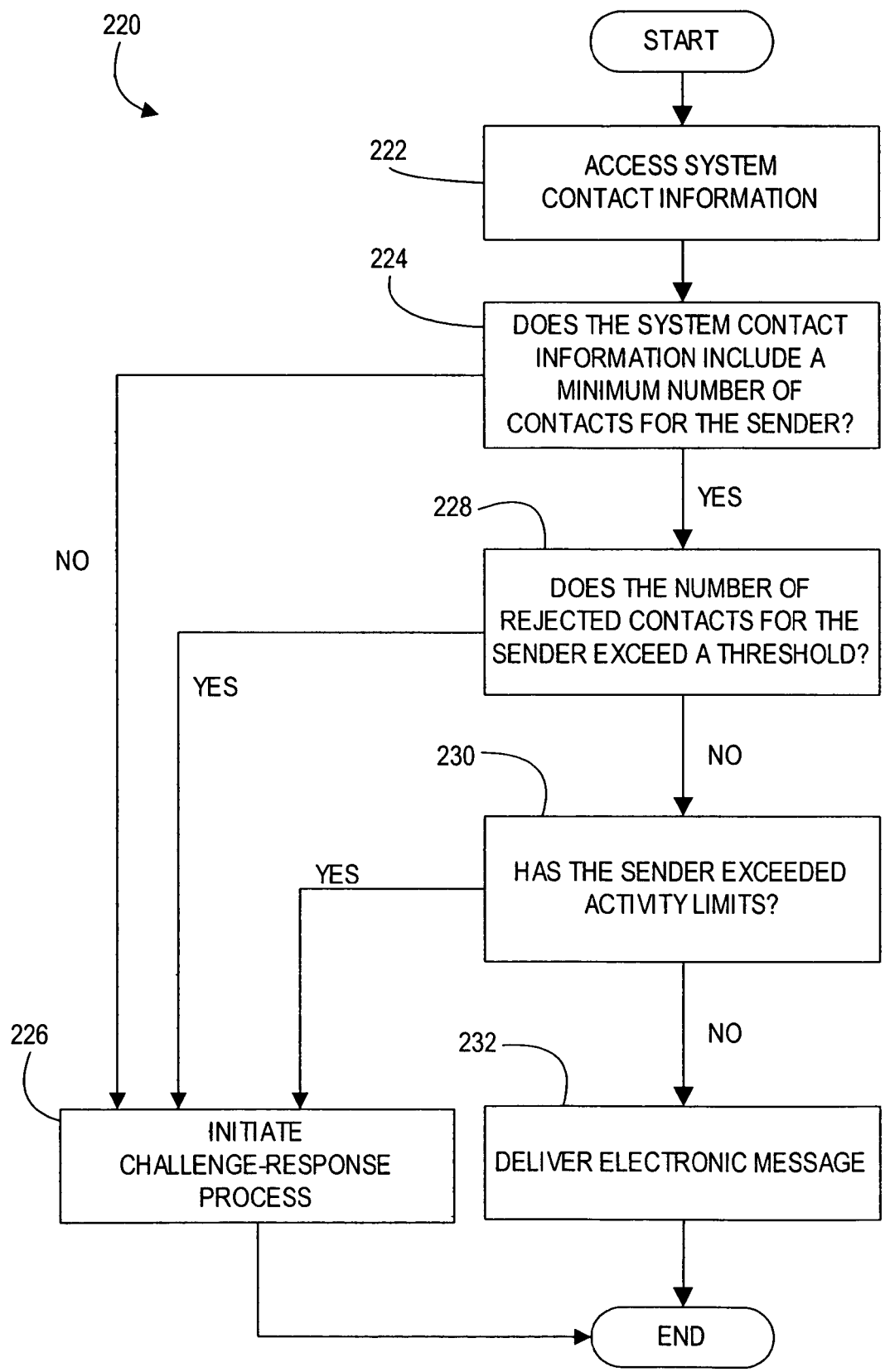
FIG. 7 is a flowchart of illustrating a method that may be used for processing electronic messages according to an embodiment of the invention.

FIG. 7 is a flowchart illustrating an exemplary embodiment of a method 220 that may be performed by one or more suitable components or systems, such as the electronic messaging management application 118, the mail processor 106, the reading/retrieval program 126, or the like. In one embodiment, the method 220 may be advantageously used to manage the delivery an electronic message. Upon receiving an electronic message (which may identify a sender and a recipient), the method 220, at a block 222, may access the system contact information 120. The method 220 may access some or all of the contact information that the method 158 (FIG. 3) may access at the block 160 (FIG. 3). The method 220 may then examine the content of the accessed system contact information 120 and/or any other appropriate information to make decisions about how an electronic message should be processed (such as, whether the accessed contact information includes a minimum number of contacts for the sender at a block 224, whether the number of rejected contacts for the sender exceeds a threshold at a block 228, how an electronic message should be otherwise processed at a block 232, and the like).

At the block 224 in FIG. 7, the method 220 may determine whether the accessed system contact information 120 includes at least a minimum number of contacts for the sender of the electronic message. For example, in one embodiment, the method 220 may determine whether any instance of the user contact information 130 includes a contact data structure (such as the contact data structure 132 in FIG. 4) for the sender of the electronic message.

If the accessed system contact information 120 does not include at least a minimum number of contacts for the sender of the electronic message, the method 220 may initiate a challenge-response process at a block 226 in FIG. 7.

If the accessed system contact information 120 does include at least a minimum number of contacts for the sender of the electronic message, the method 186 may determine whether the accessed system contact information 120 includes more rejected contacts for the sender than a specified threshold or limit at the block 228. The threshold may be a specified percentage of the total number of contacts for sender. The threshold may be a specified number of contacts.

If the accessed system contact information 120 includes more rejected contacts for the sender than a specified limit, the method 220 may initiate a challenge-response process at a block 226 in FIG. 7 or may process the electronic message in any other suitable manner.

In one embodiment, if the accessed system contact information 120 does not include more rejected contacts for the sender than a specified limit at the block 228, the method 220 may process the electronic message in any suitable manner.

In one embodiment, if the accessed system contact information 120 does not include more rejected contacts for the sender than a specified limit at the block 228, the method 220 may determine whether the sender has exceeded one or more activity limits at the block 230. If the sender of the electronic message has exceeded one or more activity limits, the method 220 may initiate a challenge-response process at a block 226 or may process the electronic message in any other suitable manner. If the sender of the electronic message has not exceeded any activity limit, the method 220 may deliver the electronic message at the block 232 or may process the electronic message in any other suitable manner.

It will be appreciated that, at the block 228, the method 186 may determine whether the accessed system contact information 120 includes more rejected contacts for the sender than a specified threshold or limit, includes fewer rejected contacts for the sender than a specified threshold or limit, includes the same number of rejected contacts for the sender as a specified threshold or limit, or any combination thereof. It will be also appreciated that the decision to proceed to the block 226, to the block 230, or to the block 232 may be based upon any of these or other determinations.

The following discussion is intended to provide an additional general description of an example of a suitable computing environment in which some embodiments of the present invention may be implemented. Although not required, some embodiments may be described in the general context of computer-executable instructions, such as program modules, being executed by computers operating within network environments. Generally, program modules include routines, programs, objects, components, data structures, etc. that may perform particular tasks or implement particular abstract data types. Computer-executable instructions, associated data structures, and program modules represent exemplary embodiments of the program code means for executing steps of the methods disclosed herein. The particular sequence of such executable instructions or associated data structures represents examples of corresponding acts for implementing the functions described in such steps. Those skilled in the art will appreciate that some embodiments may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The some embodiments may also be practiced in distributed computing environments where local and remote processing devices are linked (either by hardwired links, wireless links, or by a combination of hardwired or wireless links) through a communications network and both the local and remote processing devices perform tasks.

In one embodiment, the system contact information 120 may be maintained by one or more computing systems with each computing system having one or more system users. Each computing system need not have any particular component for any particular function. In fact, some systems may have substantially different software and/or hardware components that perform similar functions. Further, some systems may perform different or additional functions. Accordingly, because, in some embodiments, the system contact information 120 may comprise contact information maintained by a plurality of computing systems, the information maintained within a plurality of systems (rather than merely one system) may be used.

The information maintained by external computer systems may be weighted similarly as internal information, may be weighted less than internal information, or may be weighted greater than internal information, depending on the intended use. In one embodiment, the information maintained by external computer systems may be used as an additional check to confirm or to invalidate a decision made using internal information. In one embodiment, the information maintained by external computer systems may be used to determine whether or not to initiate a challenge-response process.

In one embodiment, the electronic message management application 118 may access contact information from an external social networking system. In one embodiment, a social network system may maintain information regarding the strength level between a system user and a contact. In one embodiment, a social network system may maintain information regarding one or more link chains. In one embodiment, a social network system may maintain information regarding one or more link chains and their related lengths. In one embodiment, the electronic message management application 118 may comprise a social networking system.

In one embodiment, the system contact information 120 may be stored on a server that may be accessed by one or more client computers. In one embodiment, the system contact information 120 may be stored among one or more client computers. In one embodiment, a recipient's user contact information 130 may be stored on a recipient's computer. In one embodiment, the system contact information may be stored among one or more servers connected via a network (such as a wide-area network, a local area network, the Internet, or the like), and one or more client computers may be connected to a server to access any of the system contact information 120 on any server. In one embodiment, the system contact information may be stored among one or more servers and one or more clients computers connected via one or more networks (such as a wide-area network, a local area network, the Internet, or the like), and the one or more client computers may access any of the system contact information 120 on any server, on any client, or both. Of course, the system contact information 120 may be stored in any other suitable configuration or location. Further, the system contact information 120 may be accessed and used in any other suitable manner or purpose.

The methods and systems described above can be implemented using software, hardware, or both hardware and software. For example, the software may advantageously be configured to reside on an addressable storage medium and be configured to execute on one or more processors. Thus, software, hardware, or both may include, by way of example, components, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays (FPGAs), application-specific integrated circuits (ASICs), controllers, computers, and firmware to implement those methods described above. The functionality provided for in the software, hardware, or both may be combined into fewer components or further separated into additional components. Additionally, the components may advantageously be implemented to execute on one or more computing devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for managing the delivery of an electronic message, the system comprising:
a data storage device comprising at least one computer-readable medium;
system contact information stored on the data storage device, the system contact information including user contact information for a plurality of users, the user contact information identifying one or more contacts;
an electronic messaging management module configured to access the system contact information and configured to determine whether a challenge-response process should be initiated at least in part based upon the accessed system contact information;

the electronic messaging management module further configured to perform the following:
   determine whether the system contact information includes at least one non-rejected contact for the sender;
   determine whether the sender has exceeded an activity limit;
   determine whether the system contact information includes a minimum number of contacts for the sender; and
   determine whether the number of rejected contacts in the system contact information exceeds a threshold; and
the electronic messaging management module further configured to deliver the electronic message to an inbox of a recipient specified in the electronic message if;
   the sender is included in at least one non-rejected contact for the system contact information;
   the sender has not exceeded an activity limit;
   the system contact information includes a minimum number of contacts for the sender; and
   the number of rejected contacts in the system contact information does not exceed a threshold.

2. The system of claim 1, wherein the user contact information for the plurality of users comprises one or more contact data structures embodied on a computer-readable medium and wherein the electronic messaging management module is further configured to determine an amount of information for the sender of the electronic message that is stored in the contact data structures.

3. The system of claim 1, wherein the electronic messaging management module is further configured to
   determine whether the system contact information includes at least one rejected contact for the sender 4. The system of claim 1, wherein the user contact information for the plurality of users comprises one or more contact data structures embodied on a computer-readable medium and including data manually entered by a user.

5. The system of claim 1, wherein a recipient user is associated with the electronic message and wherein the electronic messaging management module is further configured to identify at least one contact chain for the recipient user and determine a length of the at least one contact chain for the recipient user.

6. The system of claim 1, wherein a recipient user is associated with the electronic message and wherein the electronic messaging management module is further configured to identify at least one contact chain for the recipient user and calculate a strength value for at least one link in the at least one contact chain for the recipient user.

7. The system of claim 1, wherein a recipient user is associated with the electronic message and wherein the electronic messaging management module is further configured to identify at least one contact chain for the recipient user and calculate an average strength value for two or more links in the at least one contact chain for the recipient user.

8. The system of claim 1, wherein a recipient user is associated with the electronic message and wherein the electronic messaging management module is further configured to identify at least one contact chain for the recipient user and calculate a total strength value for two or more links in the at least one contact chain for the recipient user.

9. A method for processing an electronic message received within a computing system, the method comprising:
   identifying a sender of the electronic message;
   identifying, from a set of system contact information comprising contact information associated with a plurality of system users, any contact information associated with the sender of the electronic message; and
   using the contact information associated with the sender to determine whether a challenge-response message should be sent to the sender, wherein using the contact information comprises:
   determining whether the system contact information includes at least one non-rejected contact for the sender; and
   determining whether the system contact information comprises an amount of information about the sender of the electronic message stored on one or more contact data structures embodied on a computer-readable medium, the amount of information about the sender being information other than information included in an addressing portion of the electronic message that has been added to the one or more contact data structures by at least one of the plurality of users: and issuing a challenge-response message when the one or more contact data structures do not contain information other than information included in an addressing portion of the electronic message.

10. The method of claim 9, wherein using the contact information comprises one or more of:
   determining whether the system contact information includes at least one rejected contact for the sender;
   determining whether the sender has exceeded an activity limit;
   determining whether the system contact information includes a minimum number of contacts for the sender; and
   determining whether the number of rejected contacts in the system contact information exceeds a threshold.

11. The method of claim 9, wherein a recipient system user is associated with the electronic message and wherein using the contact information comprises identifying at least one contact chain for the recipient system user and determining a length of the at least one contact chain for the recipient system user.

12. The method of claim 9, wherein a recipient system user is associated with the electronic message and wherein using the contact information comprises identifying at least one contact chain for the recipient system user and calculating a strength value for at least one link in the at least one contact chain for the recipient system user.

13. The method of claim 9, wherein a recipient system user is associated with the electronic message and wherein using the contact information comprises identifying at least one contact chain for the recipient system user and calculating an average strength value for two or more links in the at least one contact chain for the recipient system user.

14. The method of claim 9, wherein a recipient system user is associated with the electronic message and wherein using the contact information comprises identifying at least one contact chain for the recipient system user and calculating a total strength value for two or more links in the at least one contact chain for the recipient system user.

15. The method of claim 9, wherein the contact information comprises data stored in one or more event data structures.

16. A method for communicating an electronic message within a computing system, the method comprising:
   receiving a challenge-response message;
   the challenge-response message sent from a computing system that
      identified, from a set of system contact information comprising contact information associated with a plurality of system users, contact information associated with a sender of the electronic message; and used the contact information associated with the sender to determine that the challenge-response message should be sent, the use of the contact information comprising determining a length of a contact chain between the sender of the electronic message and a recipient user identified in the electronic message, the length of the contact chain comprising one or more links of system users between the sender and the recipient user, and identifying a link limit away from the recipient user on which to base use of contact information:

using only the contact information associated with the system users between the recipient user and the link limit to perform two or more of:

determining whether the system contact information includes atleast one non-rejected contact for the sender;

determining whether the system contact information includes atleast one rejected contact for the sender;

determining whether the sender has exceeded an activity limit;

determining whether the system contact information includes a minimum number of contacts for the sender; and determining whether the number of rejected contacts in the system contact information exceeds a threshold.

17. The method of claim 16, further comprising transmitting the challenge-response message to the sender of the electronic message.

18. The method of claim 16, further comprising transmitting a response to the challenge-response message.

* * * * *